United States Patent

[11] 3,608,569

[72] Inventor John R. Burns
 Culver City, Calif.
[21] Appl. No. 668,038
[22] Filed Sept. 15, 1967
[45] Patented Sept. 28, 1971
[73] Assignee Parker-Hannifin Corporation
 Cleveland, Ohio

[54] PRESSURE RELIEF VALVE WITH FRANGIBLE DISK
 14 Claims, 1 Drawing Fig.
[52] U.S. Cl. ....................................................... 137/69,
 267/1, 137/468, 137/512.3, 137/540
[51] Int. Cl. ........................................................F16k 17/16,
 B64d 45/00
[50] Field of Search............................................ 220/89 A;
 137/69, 71, 540, 543.17, 525; 267/161, 162

[56] References Cited
 UNITED STATES PATENTS
 1,248,578 12/1917 Vuilleumier.................. 137/69
 3,080,091 3/1963 Philip............................ 220/89 A
 3,342,200 9/1967 Wilcox.......................... 137/512.3 X
 3,366,136 1/1968 Burton.......................... 137/468
 3,363,644 1/1968 Malec........................... 137/525 X
 FOREIGN PATENTS
 588,004 5/1947 Great Britain................. 137/540
 264,996 11/1949 Switzerland.................. 137/71

Primary Examiner—William F. O'Dea
Assistant Examiner—Richard Gerard
Attorney—John N. Wolfram ABSTRACT: A relief valve in which a passage through the valve is closed by both a frangible diaphragm and a valve poppet, the diaphragm being supported against bursting by the poppet when the latter is in its closed position but not when in its open position, the poppet being pressed with decreasing force towards its closed position throughout the range of its opening movement by a negative rate spring.

PATENTED SEP 28 1971
3,608,569
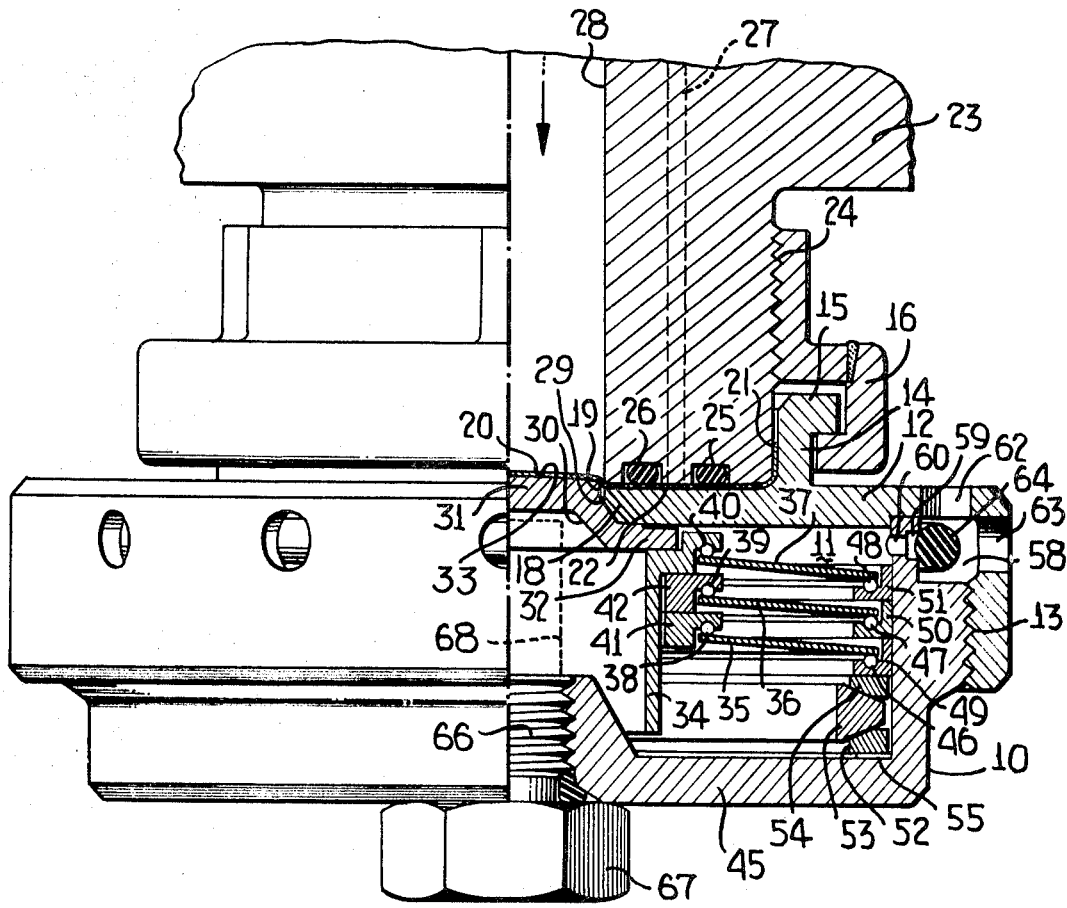
INVENTOR
John R. Burns
BY John N. Wolfram
ATTORNEY

PRESSURE RELIEF VALVE WITH FRANGIBLE DISK

The invention described herein was made in the performance of work under a NASA contract and is subject to the provisions of Section 305 of the National Aeronautics and Space Act of 1958, public law 85-568 (72 Stat. 435; 42 U.S.C. 2457).

In various types of fluid-handling systems it is desirable to employ a relief valve of the frangible-diaphragm-type in which the valve passage is sealed closed by a thin diaphragm that ruptures when the fluid pressure in the system becomes excessive. For relief valves of this type that are to be installed in high-pressure fluid systems, such as in space vehicles, it is necessary that the diaphragm bursts at a predetermined pressure within close limits and in an extremely reliable manner. Also, after the diaphragm bursts and the excess pressure has subsided, it is sometimes desirable to again close the passage, at least against significant leakage, and to have the valve remain operable to relieve system pressure if it again exceeds the predetermined value.

The present invention meets these objectives by employing a valve poppet, in addition to the diaphragm, for closing the passage, the poppet supporting the diaphragm against bursting when in its closed position and when it moves to its open position it ceases to effectively support the diaphragm against bursting. Such movement to open position is resisted by a spring means having a decreasing rate whereby bursting of the diaphragm and reseating of the poppet will occur with less variation from the predetermined pressure than would be the case with a positive rate spring.

The invention also provides a method of testing the pressure at which the poppet begins to open, with bursting of the diaphragm being prevented during such test. The drawing is a quarter cross section view of the valve with the poppet in closed position.

The valve has a body 10 providing a chamber 11 that is closed by a cap 12 threaded onto the body at 13 and which has a cylindrical portion 14 and a flange 15 that carry a nut 16. The cap also has an inwardly extending seat flange 18 with a cylindrical central opening 19 there through. A thin diaphragm 20 extends across the opening and has a cylindrical outer portion 21 pressed into cylindrical portion 14 so as to be retained relative thereto. An intermediate portion 22 of the diaphragm is clamped against seat flange 18 by an adapter 23 threaded at 24 to nut 16 and having a fluid receiving passage 28. Adapter 23 is sealed relative to the diaphragm by O-rings 25, 26 and there may be a drain passage 27 between the O-rings to drain leakage fluid to a low-pressure portion of the system.

Mounted within chamber 11 is a valve poppet 30 having a central portion 31 with a cylindrical periphery 29 closely fitting within cylindrical opening 19. The poppet is sufficiently closely confined by the annular surface of opening 19 to prevent deflection of the diaphragm in the opening when the poppet is in its closed position, the upper surface 33 of the poppet supporting the central portion of the diaphragm 20 across the width of opening 19. A flat flange 32 on the poppet engages the lower face of seat flange 18 of the cap 12 to establish the closed position of the poppet. The lower face of flange 32 is engaged with an upper face of a stop sleeve 34 and the latter is acted upon by the inner margins of negative rate Belleville springs 35, 36, 37 through circular bearing members 38, 39, 40, 41 and 42. The outer margins of the Belleville springs are supported by the bottom wall 45 of body 10 via circular bearing members 46, 47, 48, 49, 50, 51, thermal compensator rings 52, 53 and 54, and shim 55.

Ring 53 has a greater coefficient of expansion than rings 52, 54 so that the end-to-end dimension of the three stacked rings increases or decreases, accordingly as the temperature within chamber 11 increases or decreases. This also compensates for changes in the spring rate due to temperature changes.

Each of the Belleville springs 35, 36, 37 acts independently, and therefore cumulatively, upon sleeve 34 for maintaining poppet 30 in closed position when pressure of fluid in adapter passage 28 is below a predetermined value.

Formed between body 10 and cap 12 is an annular chamber 58 connected to chamber 11 by means of an annular channel 59 and a series of circumferentially spaced radial holes 60 and connected to the valve exterior via a series of circumferentially spaced openings 62, 63. An elastomeric O-ring 64 is within chamber 58 and circumferentially stretched over the outer edges of channel 59 to normally close the latter. O-ring 64 prevents ingress of foreign matter into chamber 11 from the valve exterior.

Lower wall 45 of body 10 has a central threaded opening 66 that is closed by a threaded plug 67 when the valve is in use but which may receive a plug having an extension indicated by dotted line 68 when it is desired to adjust the tension of Belleville springs 35, 36, 37, as hereinafter described.

OPERATION

When fluid pressure within passage 28 is below a predetermined value, Belleville springs 35, 36, 37 maintain poppet 30 in its closed position in which poppet flange 32 engages the lower face of seat flange 18 to close off chamber 11 from opening 19. In this position of poppet 30 the upper face of the latter engages and supports the central portion of diaphragm 20 against bursting.

When fluid pressure within passage 28 exceeds the predetermined pressure it forces the central portion of diaphragm 20 and poppet 31 downwardly against the pressure of the Belleville springs. Because the springs have a negative rate, the closing force they exert on poppet 30 decreases as the poppet moves to open position. This provides an increasing differential of the forces acting on opposite sides of the diaphragm as the poppet and diaphragm move downwardly. As the poppet nears the end of its downward stroke the differential rapidly becomes sufficient to cause the diaphragm to burst. However, even though the spring force on the poppet decreases as the poppet opens, there is still a closing spring force remaining when the bottom face of stop sleeve 34 strokes wall 45 of the body to limit further opening movement of the poppet. Thus, upon dropping of the pressure in passage 28 to less than the predetermined pressure, the springs will move the poppet to closed position.

Upon bursting of the diaphragm during opening movement of the poppet, fluid will pass from passage 28 through opening 19, chamber 11 and openings 60 into channel 59 where it will stretch and unseat O-ring 64 from the edges of channel 60 and pass through openings 62, 63 to the exterior.

During manufacture of the valves a test plug with an extension 68 is assembled to the body instead of plug 67. The valve is then connected to a test fixture having a mounting corresponding to adapter 23. Fluid pressure is directed through the test fixture to the upper central portion of the diaphragm and an observation made as to the pressure required to initially unseat poppet 30. This may be done by a suitable probe through passage 28 or by making the test plug 68 hollow and inserting a probe therethrough. The test plug serves to limit the opening movement of the poppet so that it will not pull away from the diaphragm and thus it prevents bursting of the diaphragm during this procedure. If the opening pressure is higher or lower than desired for a particular valve unit, suitable substitution of a different shim 55 or one or more of the Belleville washers may be made.

I claim:

1. In a relief valve, a body having a passage therethrough, a frangible diaphragm closing said passage, a valve poppet movable by a spring means to a position closing said passage and in which position the poppet is in supporting engagement with the diaphragm, said poppet being movable by fluid at predetermined pressure upstream of the diaphragm to a position for opening the passage, said poppet when moving towards its open position tending to move out of supporting engagement with the diaphragm whereby said fluid pressure bursts said diaphragm, said spring means having a negative rate whereby the spring force tending to close the valve decreases as the poppet moves toward its open position.

2. The valve of claim 1 in which there is a stop to limit opening movement of the poppet before the decreasing spring force reaches zero.

3. The valve of claim 1 in which there is a thermal compensator acting upon the spring to offset changes in the spring preload due to temperature changes.

4. The valve of claim 1 in which said poppet and passage have closely interfitting cylindrical portions adjacent said diaphragm preventing deflection of said diaphragm into said cylindrical portion of the passage when the poppet is closed.

5. The valve of claim 1 in which said spring means includes a plurality of springs, each of which acts upon the valve poppet independently of the others.

6. The valve of claim 1 in which said body has a flat valve seat surrounding the passage and said poppet has a flat face engageable with said flat seat to accurately position the poppet relative to the springs when the poppet is in its closed position.

7. The valve of claim 1 in which the diaphragm has a central portion closing the passage and a cylindrical peripheral portion mounted in a cylindrical portion of the body.

8. The valve of claim 7 in which the diaphragm has a flat portion between the central and peripheral portions and said body also has a flat portion against which the flat portion of the diaphragm is clamped by an adapter attached to the body.

9. The valve of claim 8 in which there is a packing between the diaphragm and the adapter.

10. The valve of claim 1 in which a separate member is interposed between said spring means and said poppet and engages the latter with a flat face to permit ready alignment of the poppet with said passage.

11. The valve of claim 10 in which said separate member has a sleevelike extension that is engageable with said body for limiting opening movement of said poppet.

12. The valve of claim 1 wherein said spring means are Belleville springs.

13. In a relief valve, a body having a passage therethrough, a frangible diaphragm closing said passage, a spring means, a member downstream of the diaphragm movable by said spring means to a position supporting said diaphragm against bursting due to pressure of fluid in said passage upstream of said diaphragm and movable by said fluid pressure to a position in which it does not effectively support the diaphragm against bursting by said upstream fluid pressure, said spring means having a negative rate whereby the spring force tending to move said member to a supporting position decreases as the member moves to a nonsupporting position, and means on said body for inserting a test plug therein to a position in which the test plug limits the opening movement of the member to a position in which it maintains effective support of the diaphragm to prevent bursting of the latter.

14. The valve of claim 13 in which said means on said body comprises a threaded opening.